Feb. 12, 1957 N. C. MILLER 2,781,250
CARBON BLACK REACTOR
Filed Feb. 18, 1952

INVENTOR.
N. C. MILLER
BY Hudson & Young
ATTORNEYS

United States Patent Office 2,781,250
Patented Feb. 12, 1957

2,781,250

CARBON BLACK REACTOR

Neil C. Miller, Borger, Tex., assignor to Phillips Petroleum Company, a corporation of Delaware Application February 18, 1952, Serial No. 272,004

5 Claims. (Cl. 23—259.5)

This invention relates to gas reactors. In one of its more specific aspects, this invention relates to an improved method and apparatus for producing carbon black. In another of its specific aspects, it relates to an improved burner for use in a carbon black furnace wherein a vaporous fuel is burned.

It is known to produce carbon black by contacting a liquid hydrocarbon, for example a gas oil, in a highly dispersed form, with hot combustion gases in a furnace. One preferred process for producing carbon by this method uses a reaction system of two cylindrical sections, one short section of large diameter, referred to hereinafter as the "combustion section," and an elongated coaxial section of considerably smaller diameter, referred to hereinafter as the "reaction section." Broadly, the process comprises passing a hydrocarbon, termed "reactant hydrocarbon," for conversion to carbon black axially into the combustion section and thence into the reaction section of the furnace. Combustion products resulting from burning a mixture of air and fuel for example fuel gas, are introduced into the combustion section in a direction tangent to its cylindrical side wall and the mixture is burned to combustion gases before it comes in contact with the carbon black producing or reactant hydrocarbon at the axis of the chamber. Fuel gas referred to herein includes any combustible hydrocarbon gas or vaporized hydrocarbon such as a vaporized hydrocarbon oil. By combustion gases is meant such gases as result from the chemical reactions of burning under the particular circumstances existing in the combustion zone. The combustion gases and the reactant hydrocarbon then pass through the reaction section in a state of sufficient annular separation to prevent carbon deposition on the cylindrical walls thereof. The tangentially added mixture is injected at sufficient velocity to flow spirally inward in the combustion section and substantially helically through the reaction section. These gases have sufficient centrifugal force to maintain a layer of the combustion gas adjacent the reaction chamber wall and accordingly prevent deposition of carbon upon this wall. The reactant hydrocarbon is converted or decomposed to carbon black by heat transferred to it by mixing at the interface between the hydrocarbon and the combustion gases and/or by radiation. Upon issuing from the reactor, the gaseous effluent carrying the carbon black is cooled, and the carbon black separated therefrom by any usual means old in the art, such as running the effluent through bags to screen out the carbon black, or as now preferred running the effluent through an electrical precipitator and/or cyclone separators. When excess air is used in the tangentially introduced mixture, this excess air supports combustion of a portion of the hydrocarbon feed added axially and under these conditions of added excess air, the heat evolved from this combustion is adsorbed by the endothermic reaction of hydrocarbon to carbon and in increasing the temperature of the reacting and reaction materials.

It is common practice in carbon black furnaces using gas as a fuel to premix the fuel gas and air before introducing the combustible mixture to the furnace. This is true whether the air and gas mixture is introduced to the burner axially or tangentially. This conventional method for operating a furnace works well so long as the furnace is in normal operation but when low flow rates are used, the flame flashes back into the supply tube. When flow rates lower than the rate of flame propagation of the mixture are used, an auxiliary burner is usually installed and used.

The burner of the present invention overcomes this disadvantage of the burners of the prior art wherein the mixture is introduced tangentially into the burner.

In at least one embodiment of this invention at least one of the following objects is attained.

It is an object of this invention to provide an improved tangential gas burner for use in a carbon black furnace.

It is another object to provide a tangential gas burner wherein the combustion supporting air is introduced tangentially to the burner tunnel.

It is another object to provide a tangential gas burner which produces a flame of substantially less axial length than the prior art burners.

It is still another object to provide an improved tangential gas burner which will allow a wide range of fuel-air velocities.

In accordance with the present invention, air, or other free oxygen containing gas, is supplied tangentially to the air supply pipe so as to describe a helical path through the burner. The rotating air supply leaves the air supply pipe through a gradual constriction sufficient to impart turbulence to the flow but insufficient to destroy the rotation of the air stream. Fuel gas is introduced radially into the center of this turbulent and rotating air stream so that the flame moves circularly as well as axially. One or more burners can be employed tangent to the combustion zone.

It is a feature of this invention that a burner is provided which allows a carbon black furnace to be operated over a wide range of combustion rates. This makes possible the use of the same burner for warm-up, generating purge gas and normal operation, where as previously, it was necessary to install separate fuel pipe for low rates.

The accompanying drawing is a diagrammatic illustration of a preferred form of my invention.

Figure 1:
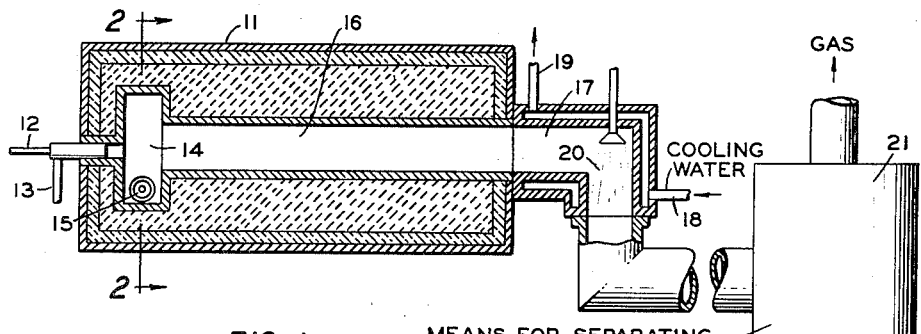
Figure 1 is a longitudinal sectional view of a furnace in which the gas burner of this invention can be advantageously employed.

Referring now to Figure 1 of the drawing, the oil to be converted into carbon black is admitted to the insulated and ceramic lined furnace 11 through pipe 12. Air is admitted through pipe 13 so as to cool and protect pipe 12 from excessive temperatures. The oil enters combustion chamber 14 where it is contacted by hot combustion gases from burner 15 and carried through reaction chamber 16. The reaction products which comprise carbon black and inert gases are cooled in water-jacketed cooling chamber 17. Cooling water enters at 18 and leaves the water jacket at 19. The products are further cooled by a water quench 20. Carbon black is separated from the gases in separator 21.

Figure 2:
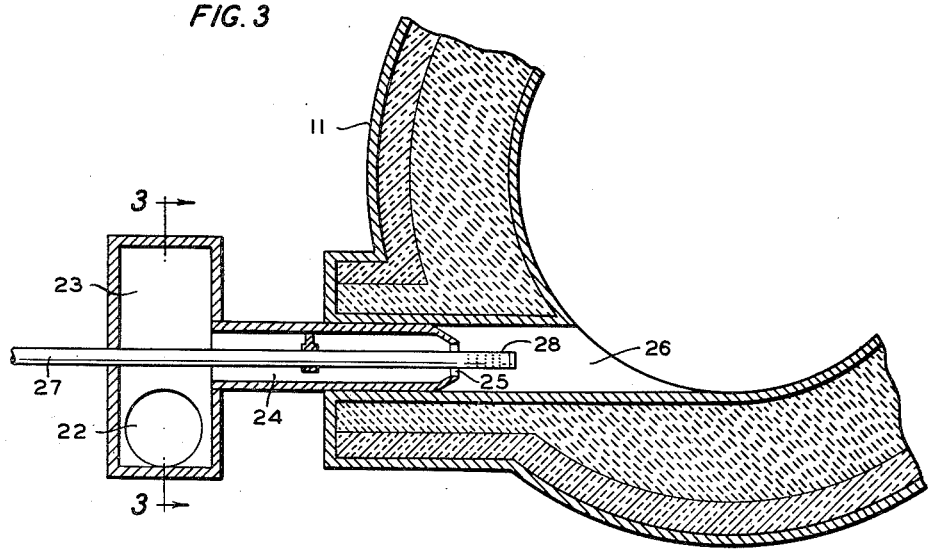
Figure 2 is a partial section of the furnace of Figure 1 on line 2—2 showing a transverse section of the gas burner and burner tunnel.

Reference is now made to Figure 2. Air, or other free oxygen containing gas, is admitted through pipe 22 tangentially to the drum 23 which has a diameter greater than its length. One or more tangential pipes 22 can be employed. The air travels helically through pipe 24 and out of frusto-conical orifice 25 into burning tunnel 26. Fuel gas is admitted through pipe 27 and is introduced radially into the burning tunnel through the gas outlet holes 28.

Figure 3:
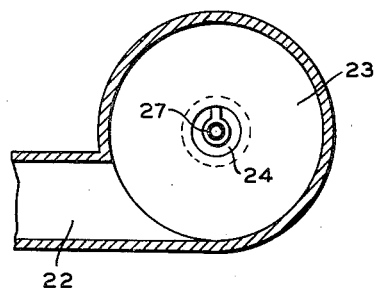
Figure 3 is a sectional view of the air drum of Figure 2 on line 3—3.

Figure 3 is a sectional view of the air drum 23 showing the relation of the tangential air supply pipe 22 to the drum.

The frusto-conical orifice of the air supply pipe is preferably greater than ¼ the cross-sectional area of the air supply pipe, more preferably from 27 to 30 percent of the cross-sectional area of the pipe. The purpose of the frusto-conical orifice being to provide turbulent flow of the air as it leaves the pipe without destroying the helical flow of the air. The openings in the fuel gas pipe can be from 0.5 to 2, preferably 0.75 to 1.25 frusto-conical orifice diameters downstream from the frusto-conical orifice. The fuel gas supply pipe can be adjustable so that the distance of its end downstream of the frusto-conical orifice can be varied within the above limits. The helical flow of air and gas produces a flame that is shorter in axial length than in axially introduced air burners because the flow travels circularly as well as axially.

Variations and modifications are possible within the scope of this disclosure of the invention, the essence of which is that a tangential gas burner for a carbon black furnace is provided wherein air is introduced tangentially to the burner across a turbulence producing restriction and fuel gas is introduced radially to said burner at a point downstream from the introduction of air.

I claim:

1. In a hydrocarbon reactor comprising an elongated, cylindrical reactor chamber open at both ends, a cylindrical combustion chamber having a diameter greater than that of said reactor chamber and a length less than its own diameter, closed at one end and axially connected to and communicating with one open end of said reactor chamber at the open end of said combustion chamber; at least one combustion tunnel, open at both ends, tangentially connected to and communicating with said combustion zone, the improvement which comprises a free oxygen supply conduit extending into said tunnel and terminating within said tunnel in a frusto-conical section converging in a downstream direction and forming an orifice at the downstream end of said conduit, the area of said orifice being from 27 to 30 percent of the cross-sectional area of said conduit, a free oxygen supply chamber having a diameter greater than that of said supply conduit and a length less than its own diameter, closed at one end and axially connected to and communicating with the open upstream end of said supply conduit at the open end of said supply chamber; at least one free oxygen supply pipe tangentially connected to and communicating with said supply chamber; a fuel gas supply pipe having a uniform cross-sectional area throughout, a closed downstream end and a plurality of outlets substantially perpendicular to the axis of said fuel gas supply pipe disposed around the circumference of its closed end extending through said supply chamber and supply conduit and terminating from 0.75 to 1.25 orifice diameters downstream from said orifice; and a reactant hydrocarbon supply pipe extending centrally into said combustion chamber through the center of said closed end of said combustion chamber.

2. A burner for supplying heat to a carbon black furnace comprising a free oxygen supply conduit terminating in a frusto-conical section converging in a downstream direction and forming an orifice at the downstream end of said conduit, the area of said orifice being from 27 to 30 percent of the cross-sectional area of said conduit; a free oxygen supply chamber having a diameter greater than that of said supply conduit, closed at one end and the open end axially connected to and communicating with the open upstream end of said supply conduit; at least one free oxygen supply pipe tangentially connected to and communicating with said supply chamber; and a fuel gas supply pipe having a uniform cross-sectional area throughout, a closed downstream end, and a plurality of outlets substantially perpendicular to the axis of said fuel gas supply pipe disposed around the circumference of its closed downstream end, extending through said supply chamber and said supply conduit and terminating from 0.5 to 2 orifice diameters downstream from said orifice.

3. The burner of claim 2 wherein the distance that the closed end of the fuel gas supply pipe is situated downstream from said orifice is adjustable within the stated limits.

4. A burner for supplying heat to a carbon black furnace and adapted to be positioned in a burner tunnel of said furnace comprising a free oxygen supply conduit, having an outside diameter less than the inside diameter of said burner tunnel in said carbon black furnace, terminating at its downstream end in a frusto-conical section whose walls converge in a downstream direction and terminate in an orifice whose minimum cross-sectional area is greater than ¼ the cross-sectional area of said supply conduit; a free oxygen supply chamber having a diameter greater than that of said supply conduit, having one end closed and the open end connected to and communicating with the open upstream end of said supply conduit; at least one free oxygen supply pipe tangentially connected to and communicating with said supply chamber; and a fuel gas supply pipe having a closed downstream end, and a plurality of outlets around the circumference of its closed downstream end extending axially through the center of each said supply chamber and said supply conduit and terminating from 0.5 to 2 orifice diameters downstream from said orifice.

5. The burner of claim 4 wherein the end of said fuel gas supply pipe is from ½ to 1½ orifice diameters downstream from said orifice.

References Cited in the file of this patent

UNITED STATES PATENTS

| 732,685 | Johnston | June 30, 1903 |
| 1,045,829 | Fogler | Dec. 3, 1912 |
| 1,890,816 | Keith | Dec. 13, 1932 |
| 2,375,796 | Krejci | May 15, 1945 |
| 2,375,798 | Krejci | May 15, 1945 |
| 2,499,437 | Weigand et al. | Mar. 7, 1950 |
| 2,499,556 | Zink | Mar. 7, 1950 |
| 2,529,873 | Heller | Nov. 14, 1950 |
| 2,594,562 | Jackson | Apr. 29, 1952 |
| 2,597,992 | Heller | May 27, 1952 |
| 2,641,534 | Krejci | June 9, 1953 |

FOREIGN PATENTS

| 301,851 | Great Britain | Dec. 3, 1928 |